Figure 1:
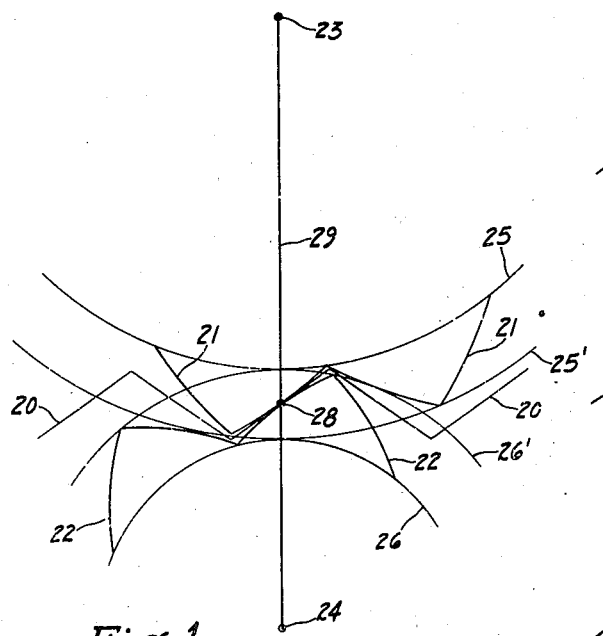

Jan. 19, 1943.  E. WILDHABER  2,308,558
GEAR
Filed April 3, 1941   5 Sheets-Sheet 1

Inventor
ERNEST WILDHABER
Attorney

Jan. 19, 1943.  E. WILDHABER  2,308,558
GEAR
Filed April 3, 1941  5 Sheets-Sheet 2

Inventor
ERNEST WILDHABER
By
B. E. Schlesinger
Attorney

Jan. 19, 1943.  E. WILDHABER  2,308,558
GEAR
Filed April 3, 1941  5 Sheets-Sheet 4

Inventor
ERNEST WILDHABER
By
Attorney

Jan. 19, 1943.  E. WILDHABER  2,308,558
GEAR
Filed April 3, 1941  5 Sheets-Sheet 5

Inventor
ERNEST WILDHABER
By
Attorney

Patented Jan. 19, 1943

2,308,558

UNITED STATES PATENT OFFICE 2,308,558

GEAR

Ernest Wildhaber, Brighton, N. Y., assignor to Gleason Works, Rochester, N. Y., a corporation of New York Application April 3, 1941, Serial No. 386,629

12 Claims. (Cl. 74—462)

The present invention relates to gears for transmitting non-uniform motion and in particular to varying-leverage gears such as may be used in automotive differentials for partial locking.

Varying-leverage gears are so-called because as the gears rotate together, a periodic variation in leverage or torque ratio will occur. When such gears are used in an automotive differential, if one drive wheel slips, there will be a resulting periodic increase in power on the other drive wheel and thus the vehicle will be helped to pull itself out of the mud or snow in which it has become mired.

In gears which transmit uniform motion, the instantaneous axis of relative motion remains fixed as the gears rotate together. In varying-leverage gears, however, the instantaneous axis of relative motion moves back and forth in the plane of the gear axes as the gears rotate together. It may seem quite easy to make varying-leverage gears, and it might be thought that all that is necessary is to make some change in tooth shape so that the gears will not transmit uniform motion. The problem, however, is to devise a pair of varying-leverage gears in which the sides of the teeth will be continuously in mesh and motion will not be transmitted merely with the corners of the teeth. Moreover, it is desirable to keep the backlash uniform and quite small in all positions of rotation. Further than this, the gear pair should produce a given variation in leverage, at least roughly definable.

Originally the tooth shapes of varying leverage gears were developed by empirical or so-called "cut and try" methods. At the present time, however, the tooth shapes are based upon more definite kinematic principles. In the present conventional form of varying-leverage gears, each tooth profile is a convex circular arc of comparatively large radius for the greater portion of the height of the tooth and has a convex portion of much smaller radius adjacent the top of the tooth. When a pair of such gears are in mesh, the top portion of the profile of the tooth of one gear meshes with the root portion of the profile of the tooth of a mating gear, with the result that the short portion near the tip of each tooth has a maximum of sliding contact with the tooth surface of the mating gear and is for this reason subject to excessive wear. Further than this, the amount of variation in leverage obtainable with the present conventional form of tooth is definitely limited.

One object of the present invention is to provide a varying-leverage tooth shape in which the tendency to wear is reduced or avoided entirely.

Another object of the present invention is to devise a form of varying-leverage gearing which will permit of obtaining a greater variation in leverage than has been attainable with any other prior known form of such gearing.

Another object of the present invention is to devise a form of varying leverage gearing which will be more flexible than known gearing of this character.

Other objects of the invention will be apparent hereinafter from the specification and from the recital of the appended claims.

Figure 12:
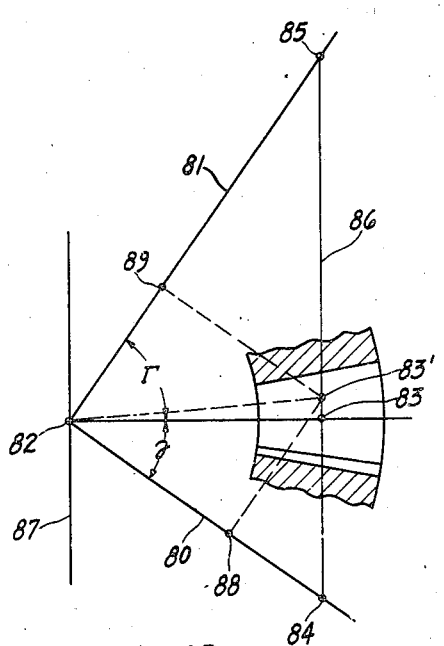
Figure 7:
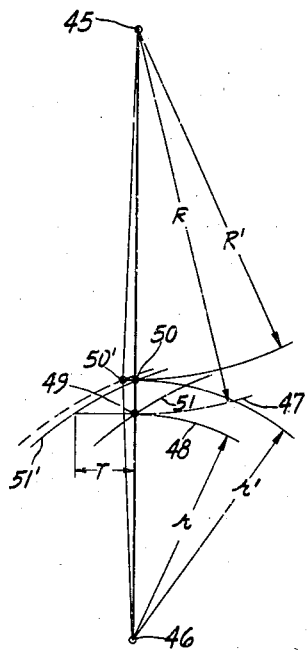
Figure 17:
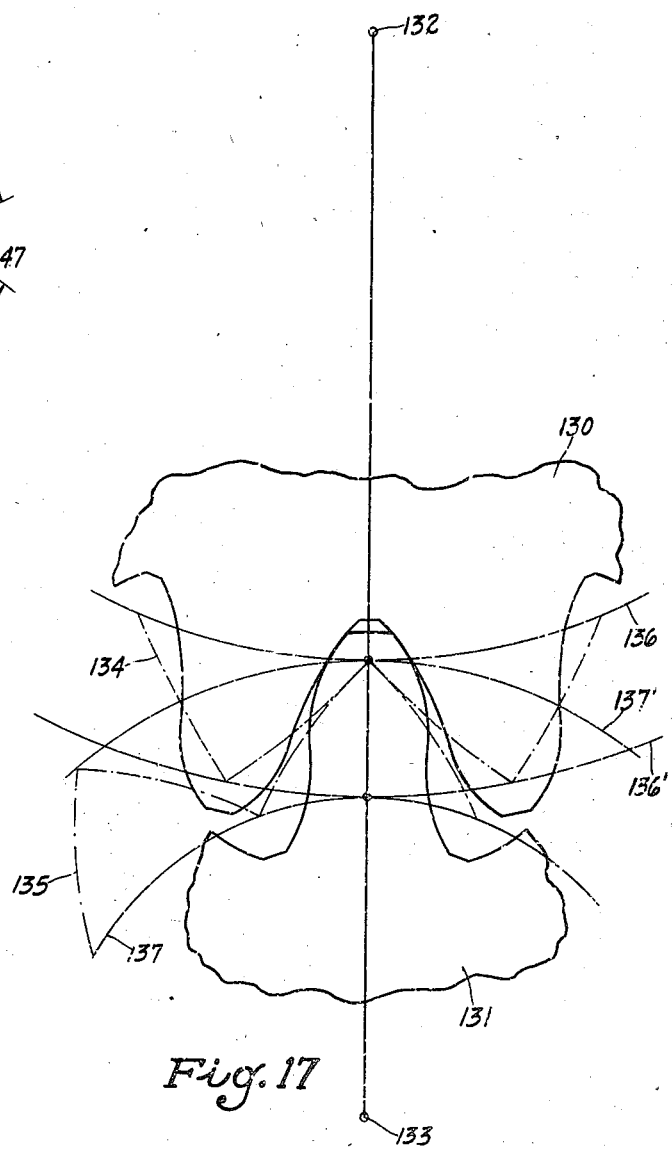

In the drawings:

Fig. 1 is a diagrammatic view showing the undulatory pitch lines of a pair of varying-leverage gears made according to the present invention and showing also the undulatory pitch line of the basic rack or crown gear to which the gears are generated conjugate;

Figs. 2 to 6 inclusive are diagrammatic views illustrating various forms which the pitch line of the basic rack or crown gear may take;

Fig. 7 is a diagrammatic view illustrating the relationship between a pair of varying-leverage gears and their basic rack or crown gear;

Figs. 8 to 11 inclusive are diagrammatic views illustrating how this relationship may be determined;

Fig. 12 is a fragmentary sectional view through a pair of bevel gears made according to this invention, and further illustrating the relationship between said gears;

Figs. 13 to 16 inclusive are diagrammatic views showing the tooth profile shapes of a pair of gears made according to one embodiment of the present invention, and illustrating, respectively, different positions of mating tooth surfaces as the gears rotate together in mesh; and Fig. 17 is a fragmentary view illustrating diagrammatically the construction of a pair of gears made according to a further embodiment of this invention to produce a greater variation in leverage than is obtainable with previous known design.

As previously indicated, in the prior known forms of varying-leverage gearing, the tooth profiles have consisted of two convex curves of different radii. In the gearing of the present invention, each tooth profile has a convex portion and a concave portion. The flank or bottom portion of the tooth profile is concave, and the top or face portion is convex. With this construction, there is relatively little difference in curvature between the top portion of one tooth and the root portion of a mating tooth. Hence there is less surface stress between the mating tooth surfaces and therefore less wear. It has been found, also, that with this construction, a greater variation in leverage is attainable than with prior forms of varying-leverage gears.

In the preferred construction the concave portion of the tooth is curved increasingly in a direction towards the bottom of a tooth and usually the convex portion of the tooth is curved increasingly in a direction toward the tip of the tooth so that the radii of curvature of the concave and convex portions of a tooth profile are largest at the point of juncture of the convex and concave portions.

Gears that transmit uniform motion are generated conjugate to a basic rack or crown gear. The present invention is based upon the discovery that even for varying-leverage gearing, basic members exist, especially a basic rack or a basic crown gear, which will contact with the two gears of a pair along the same lines as the gears contact with one another. Thus the two members of a pair of varying-leverage gearing may be generated to have calculated and correct kinematic engagement.

The basic rack or crown gear for varying-leverage gears has the same shifting instantaneous axis as the gears have themselves, and the motion of the gears themselves can be conveniently described by the pitch line of the basic rack or crown gear. The motion of the rack or crown gear and of each gear is so inter-related with the rotation of the gears themselves that each combination has the same shifting instantaneous axis at all times.

The basic gear has, then, an undulatory pitch surface, such as indicated at 20 in Fig. 1. The extent of the undulation of the pitch surface 40 of this basic member is determined by the amount of shift of the instantaneous axis of the gears as they rotate in mesh. The pitch surfaces of the mating gears are also undulatory surfaces, as denoted at 21 and 22, respectively, and the extent of the undulations of these pitch surfaces is again determined by the amount of shift of the instantaneous axes of the gears themselves as they rotate in mesh. The axis of the gear or larger member of the pair is denoted at 23 and the axis of the pinion is denoted at 24. The circles 25 and 25' denote the minimum and maximum distances of the instantaneous axis away from the gear axis 23, while the circles 26 and 26' denote the minimum and maximum distances of the instantaneous axis away from the pinion axis 24.

28 denotes one position of the instantaneous axis. In all positions of the instantaneous axis, the axis lies at the intersection of the pitch line 20 of the basic gear with the plane 29 containing the axes 23 and 24 of the mating gears.

The pitch lines 21 and 22 of the gears also pass through the instantaneous axis at all times and they roll without sliding on each other and on the pitch line of the basic gear.

The pitch lines of the basic gear can have various shapes, and by assuming a pitch line of a given shape, we have assumed the displacement of the instantaneous axis in terms of the position of the basic gear, and thus characterized the motion of the two gears. With various shapes of pitch lines of the basic member, therefore, we obtain different variations in motion of the mating gears and different profile shapes for those gears.

It is therefore possible by a proper selection of the shape of the pitch line of the basic rack to secure any desired variation in leverage in a pair of mating gears.

Figure 2:
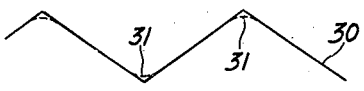
Figure 3:
Figure 4:
Figure 5:
Figure 6:

Different possible shapes for the pitch line of the basic gear are shown for the sake of illustration in Figs. 2 to 6, inclusive, but other different pitch line shapes may be employed. Fig. 2 shows a pitch line 30 whose undulations have straight sides. The undulations may, however, be rounded off at their tops and bottoms as indicated by the dotted lines 31. Fig. 3 shows a pitch line 33 whose undulations have curved but symmetrical sides or slopes. Fig. 4 shows another form of pitch line 35 having undulations whose opposite sides or slopes are curved and symmetrical, but whose sides or slopes are oppositely curved from the sides or slopes of the undulations in Fig. 3. Fig. 5 shows a pitch line 37 having unsymmetrical curved sides or slopes. Fig. 6 shows a pitch line 39 whose sides or slopes are of double curvature, each slope having a convex and a concave portion. That is, for each slope, there is a point of inflection 40 where the inclination is largest.

I shall now describe a general procedure for determining corresponding displacements of the two gears and of the basic member, and for determining the extreme positions of the instantaneous axis.

Reference will first be made to Fig. 7. Here 45 and 46 denote the axis of the two mating gears. If these gears were designed to transmit uniform motion, their pitch surfaces would be circular as denoted at 47 and 48, respectively, and the instantaneous axis 49 of their relative motion would be at the point of tangency of the pitch lines 47 and 48 and would remain at constant distances R and $r$, respectively, from the axes 45 and 46 of the two gears. The radii $r$ and R of the pitch surfaces of the two gears would, moreover, be proportional to the tooth numbers of the gears, if the gears were spur, and to the tooth numbers of the back cone development of the gears, if the gears were bevel.

The gears we are dealing with here are, however varying-leverage gears. In our consideration of the mesh of these gears, let us start from the position where the instantaneous axis coincides with the instantaneous axis 49 of uniform motion gearing. Here one slope or side of the pitch line of the basic rack or crown gear is denoted at 51. 50 denotes another position of the instantaneous axis of the non-uniform motion gearing after some displacement of the gears, and 51' is the corresponding position of the side of the pitch line of the rack or crown gear. At an infinitesimal displacement $dT$ equal to the distance 50—50' of the pitch surface 51 of the basic member, the gears will roll as if the point 50 were the pitch point, through angles $$d\theta_p = \angle\ 50\text{---}46\text{---}50' \text{ and } d\theta_G = \angle\ 50\text{---}45\text{---}50'$$

which are inversely proportional to the radii $r'$ and $R'$ to the new pitch point or instantaneous axis 50 of mesh of the gears. Hence:

$$dT = r' \cdot d\theta_p$$

and $$dT = R' \cdot d\theta_G$$

with the angles measured in radians. Therefore:

$$\frac{d\theta p}{dT} = \frac{1}{r'} \text{ and } \frac{d\theta G}{dT} = \frac{1}{R'} \qquad (1)$$

Now assuming that the distance 49—50 is equal to $y$, we have:

$r' = r + y$; and $R' = R - y$; where $y$ is contained in the shape of the assumed pitch line of the rack or crown gear. It can be considered as the ordinate of said pitch line at the abscissa T. We have, therefore:

$$\frac{d\theta_p}{dT} = \frac{1}{r+y} \text{ and } \frac{d\theta_G}{dT} = \frac{1}{R-y} \quad (1a)$$

If the said pitch line of the basic gear has straight sides having an inclination to the direction of motion, we have $$y = T \cdot \tan \varphi_0$$

If the said pitch line is of parabolic nature, we have $$y = T \cdot \tan \varphi_0 + cT^2$$

where $c$ is plus or minus depending on whether the sides of the undulations of the pitch surface of the basic gear are concave or convex curves. In this case, and in many other cases, the angles $\theta_p$ and $\theta_g$ can be obtained in terms of $T$ by direct computation. They are found to be logarithmic functions in the above two cases.

Figure 8:
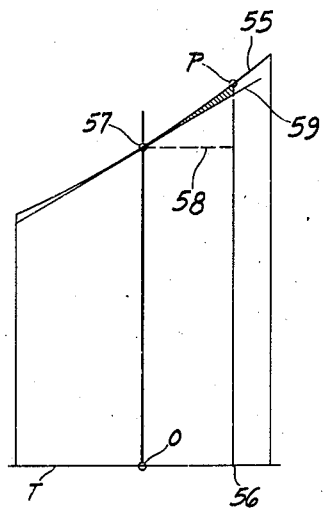
Figure 9:
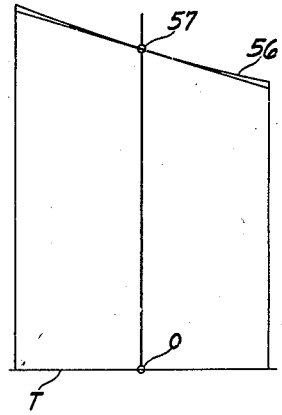

A general graphical method for determining the corresponding turning angles of the two members of the gear pair will now be described for symmetrical pitch lines of any shape. Fig. 8 is a graph applying to the pinion, and Fig. 9 is a graph relating to the gear. In the graps of Figs. 8 and 9, the quantities $$\frac{r \cdot d\theta_p}{dT} = \frac{r}{r+y}$$

and $$\frac{R \cdot d\theta_G}{dT} = \frac{R}{R-y}$$

respectively, are plotted as ordinates, with distances T as abscissas. The origin O corresponds to the position 49 of the instantaneous axis (Fig. 7) with $y=0$. Curve 55 (Fig. 8) corresponds to one slope of the undulating pitch line of the pinion, and curve 56 (Fig. 9) corresponds to the mating slope of the pitch line of the gear.

It is readily understood by those familiar with mathematics that the quantity $(r \cdot \theta_p)$ defined by the above differential equation can be measured by the area included between the parallel ordinates P—56 and O—57, the base line O—56, and the curve P—57, that is, by the line P—56—O—57. The area of the rectangle erected over the base O—56 and terminating at the dotted line 58 expresses $(r \cdot \theta_p)$ for uniform motion gearing. We can very easily compute the area which extends from the base O—56 up to tangent 59 at point 57. All that is left to measure, therefore, with known methods of surface measurement, is the little shaded area which extends from the tangent to the curve 57—P. High accuracy can be obtained by plotting this portion separately on a large scale. In this way, we can determine the position of various points P along the curve or slope 55 and thereby determine the shape of this curve. This same procedure can be followed in obtaining from Fig. 9, for the gear, the turning angle corresponding to any displacement T of the basic rack.

Figure 10:
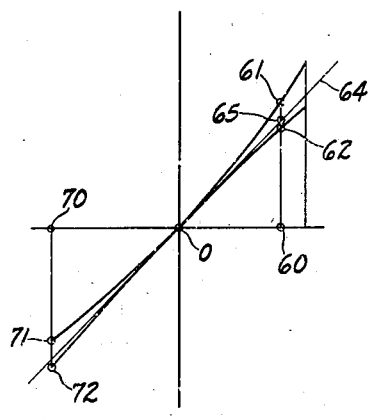
Figure 11:
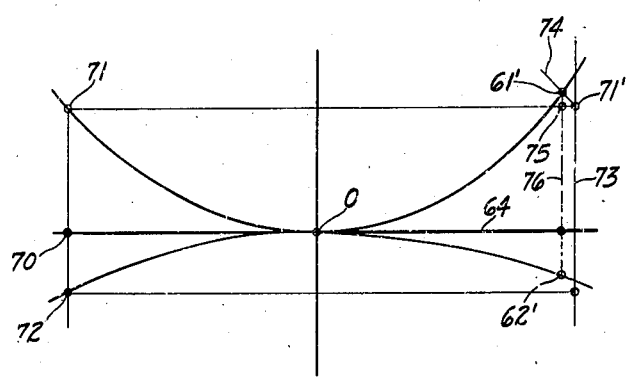

The result $(r\theta_p)$ and $(R\theta_G)$ can be plotted as ordinates in terms of T as abscissa as shown in Fig. 10. Thus the ordinate 60—61 measures $r\theta_p$ and the ordinate 60—62 measures $R\theta_G$ at the same abscissa O—60. The two curves have a common tangent 64 at O. This tangent characterizes uniform motion gears.

Fig. 10 is primarily an explanatory diagram and is not required in the actual procedure. We may plot on a suitably large scale, the ordinate as measured from the tangent 64, that is, the distances 65—61 and 65—62. This has been done in Fig. 11. The ordinates are here therefore proportional to the areas above the dotted line 58 of Fig. 8 and up to the curve 55, in the case of the pinion curve. The same is true of the gear curve as shown in Fig. 9.

We shall now determine the upper and lower ends of one slope or side of an undulation of the pitch line, and the corresponding turning angles of the gears. The turning angles must differ at the extreme points of slope of the pitch line by half an angular pitch, and $r\theta_p$ and $R\theta_G$ must also differ by exactly half a pitch.

If we were working with Fig. 10, we would have to find ordinates which differ by exactly one-half pitch on both curves at the same abscissas $T_1$ and $T_2$. A similar procedure is observed with Fig. 11. We start by assuming for trial an abscissa $T_1 = O$—70. It corresponds to an ordinate 70—71 of the upper curve and to an ordinate 70—72 of the lower curve. We now locate the points 61' and 62' which correspond to one-half pitch difference on the two curves. Points 71 and 61' are apart horizontally a distance of nearly one-half pitch. It would be exactly one-half pitch if the ordinates at these points were equal. We first draw an ordinate 73 which has a horizontal distance of one-half pitch from the ordinate 71—72. We locate point 71' which has the same ordinate as point 71. Then we draw line 74 through point 71' at an angle of 45° to the vertical, provided that the horizontal and vertical scales are the same, that is, that the items are shown in the magnification in both directions. 61' is the point of intersection of the line 74 with the curve. Distance 71—75—61' is evidently equal to distance 71—71' and to one-half pitch, for 75—61' is equal to 75—71', when the line 74 is inclined at an angle of 45°.

We now locate point 62' on the lower curve in the same manner. Ordinarily points 61' and 62' are not on the same ordinate 76 at first trial, that is, these points may have different abscissas. In this case, we repeat the procedure, assuming a different abscissa $T_1$ and starting out from different points 71, 72, we continue with a known process of interpolation until the points 61' and 62' have the same abscissa $T_2$. With $T_1$ and $T_2$ determined, we find the extreme positions of the instantaneous axis and the circles 25, 25' and 26, 26' (Fig. 1) from the given pitch line of the basic rack or crown gear. The accuracy of the procedure may be increased, if desired, by omitting the central position of Fig. 11 and by drawing the end portions in a still larger scale and moving said end portions together. The central portions may be separately drawn and are not needed for determining the end points. In any case, Fig. 11 or its substitute describes the corresponding mesh position of the gear pair and their basic member and thereby solves the chief problem of varying motion gearing in a general manner. Bevel gears are usually analyzed in the back cone and can be treated so here. Ordinarily this is merely an approximation, but that is not the case with the present method of analysis. The problem can be solved exactly in the back cone.

Fig. 12 is a section through the axes 80 and 81 of a pair of varying-leverage bevel gears having their common apex at 82. 83 is the position of the instantaneous axis or pitch point corresponding to the position which the instantaneous axis or pitch point would occupy were the gears made to transmit uniform motion. The pitch point and the back cone are here shown laid through the middle of the tooth. The back cone apices 84 and 85 are on a line 86 perpendicular to the line 82—83, and the axis 87 of the basic crown gear is also perpendicular to the line 82—83. 82—83' is another position of the instantaneous axis during the mesh of the varying-leverage bevel gears. Point 83' has an ordinate $y$ equal to distance 83—83' which is given by the assumed shape of the pitch line of the basic crown gear in terms of its displacement T as before. With $r$=distance 83—84, and $R$=distance 83—85, Equation 1a covers the motion in the back cone development.

To get the actual motion about the pinion axis 80, we have to use the actual radius 83'—88 in place of 83'—84; and on the gear we have to use the actual radius 83'—89 in place of the back cone radius 83'—85. The actual radius 83'—88 for the pinion is equal to $(r+y) \cdot \cos \gamma$; and the actual radius 83'—89 for the gear is equal to $(R-y) \cos \Gamma$.

The differential relationship at any instant is:

$$(r+y) \cdot d\theta_p \cdot \cos \gamma = dT = (R-y) \cdot d\theta_G \cdot \cos \Gamma$$

Then:

$$r \cdot d\theta_p \cdot \cos \gamma = dT \cdot \frac{r}{r+y}$$

and $$R \cdot d\theta_G \cdot \cos \Gamma = dT \cdot \frac{R}{R-y}$$

If now we let $A$=the mean cone distance 83—82, then $$r \cos \gamma = A \sin \gamma; \text{ and } R \cos \Gamma = A \sin \Gamma$$

Then $$(A \sin \gamma) \cdot d\theta_p = dT \cdot \frac{r}{r+y}$$

and $$(A \sin \Gamma) d\theta_G = dT \cdot \frac{R}{R-y}$$

The left side of these differential equations is a distance on the circle through point 83 concentric with either the pinion axis or the gear axis. It is equal to the corresponding distance of the back cone. Like the increments, so also the whole distances are the same as in the back cone without any error. While point 83 is preferably selected as the pitch point for gears that transmit uniform motion, other points could also be chosen as the origin if desired.

In Figs. 13 to 16 inclusive, I have shown the tooth shapes of a pair of gears constructed according to one embodiment of this invention. Here, I have assumed that the pitch line of the basic gear has straight sides or slopes and that these sides or slopes are inclined at an angle of 35° to the plane 90 that contains the axes 91 and 92 of the mating gears. That is, $\phi_0 = 35°$. Further than this, I have assumed that the teeth of the basic rack or crown gear have straight sides, at least at the top and bottoms of their profile.

The two mating gears are designated at 93 and 99, respectively, and their teeth are denoted at 94 and 95, respectively. Each gear has teeth whose profiles are concave in the lower portion and convex in the upper portion.

Figures 13, 14:
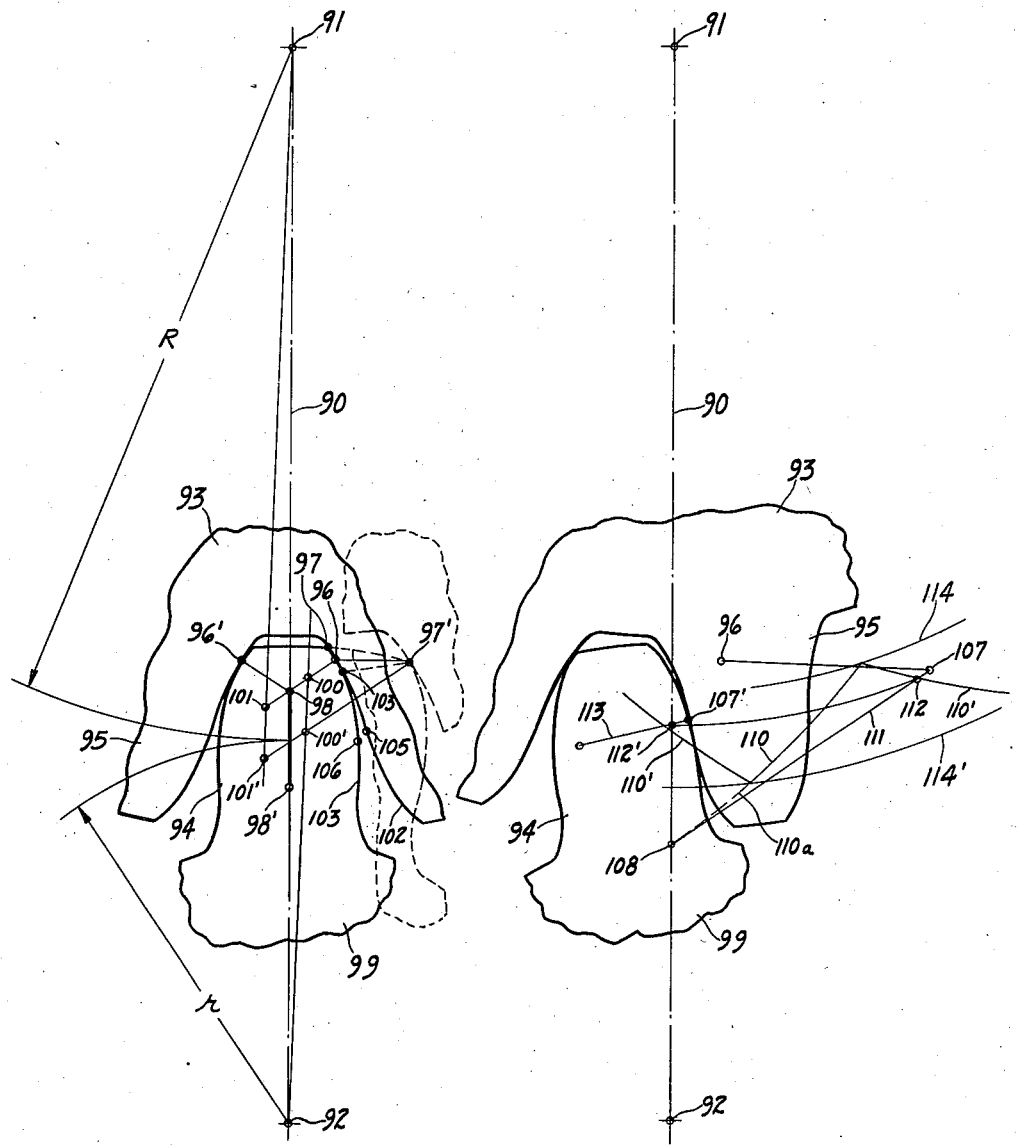

In Fig. 13, I have shown in full lines one position of the gears wherein mating tooth surfaces contact in points 96 and 96' at opposite sides of the teeth. In dotted lines I have shown also another position of the gears where the extreme point 97 of a pinion tooth profile is in contact with the mating gear tooth profile in point 97'. 96 and 96' are points of contact between the gears when the instantaneous axis is at its highest position 98. 98' denotes the lowermost position of the instantaneous axis. With the assumed pitch line of the basic gear, the gears themselves will have a straight line of action 96—97, as can be demonstrated mathematically.

Let $\varphi$ denote the pressure angle of the mating tooth surfaces at the point of contact 96 (Fig. 13), that is, the angle between the normal 96—98 at the point of contact 96 and the direction of peripheral motion of the gears at the point 98. The angle between the normal and the peripheral direction at point 98 is also the angle of inclination of the straight rack profile to the line of centers 92—91 and $\Delta\phi = \phi_0 - \phi$.

One characteristic of the present invention is that the inclination of the tooth normal 96—98 to the peripheral direction at 98 is comparatively high. This inclination or pressure angle is more than 50% larger than at the middle of the tooth. It is just a little smaller than the inclination of the pitch line of the basic gear at that point. I have found that with the above assumptions, the line of action 96—97 is sloped downwardly at an angle $\Delta\phi$, the point 97' being lower than the point 96. Further, I have found that the centers of profile curvature 100 and 100' of the convex portion of the pinion tooth profile 103 at the contact points 96 and 97', respectively, lie on the line 100—92 which is inclined at an angle $\Delta\varphi$ to the line of centers 91—92, and that the centers 101 and 101' of the concave portion of the gear tooth profile 102 at the points of contact 96, 97' are located on line 101—91 which is also inclined at an angle $\Delta\varphi$ to the line of centers 91—92. The lines 100—92 and 101—91 are perpendicular to the line of action 96—97'. These lines are the locus of the curvature centers of mesh.

The intimacy or degree of contact between the mating tooth surfaces of the two gears can best be judged by the positions of the curvature centers, and it is seen that a large improvement of contact has been made as compared with prior known forms of varying leverage gears. Part of this improvement is due to increase in the pressure angles at the tops and bottoms of the teeth and part is due to the intimacy of contact between the concave and convex portions, respectively, of the pinion and gear tooth profiles.

The concave portion of the profile 102 of the gear tooth 95 extends outwardly from the root of the tooth beyond the point 103 up to the point 105, and the convex portion 96—106 of the tooth profile 103 of the pinion tooth 94 is made conjugate to it.

Fig. 14 shows a position of the gears after they have rotated through a slight angle from the position shown in Fig. 13. Here 110 denotes the pitch line of the gear. Let us take point 107 (Fig. 14) which is on the extended line of action 96—97' beyond the point 97' of Fig. 13. The normal 111 at the point of generating contact 107 is parallel to normal 98—96, and intersects the line of centers 91—92 in a point 108. Consequently the extension 110a of the slope 110 of the pitch line of the gear must pass through the point 108. This then locates the turning position of the pitch line of the gear, and the intersection point 112 with the slope 110' of the pitch line.

The pitch line of the gear or pinion may be determined as previously stated from the pitch line of the basic rack or crown gear. It can be described by the radius vector drawn through the center 91 or 92, respectively, and by the angle $\theta_g$ or $\theta_p$, respectively. The radius vector is $(R-y)$ or $(r+y)$, respectively, where $y$ is a function of T and in the present instance where $y$ is equal to $\tan \phi_o T$. $\theta_G$ and $\theta_p$ have been determined before in terms of T.

Contact of the point 107 with the pinion occurs in position 107' (Fig. 14) when the points 107 and 112 and the normal 111 have been turned about the gear axis 93 until the point 112 reaches the axial plane 90 at the position 112'. Normal 111 has then a much reduced inclination as denoted at 113. This measures the pressure angle at the point 107'. In this position, the instantaneous axis passes through the point 112' and the pinion and gear pitch lines touch each other at that point. This then also determines the turning position of the pinion pitch line and of the pinion. Intermediate points may be determined in this same manner. 114 and 114' denote circles concentric to the gear axis 91 containing the extreme points of the instantaneous axis.

Figure 15:
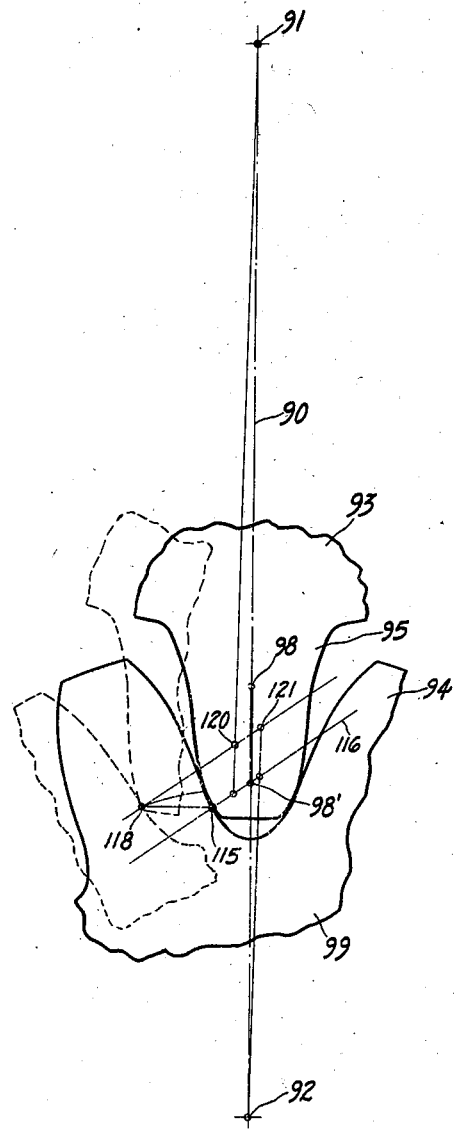
Figure 16:
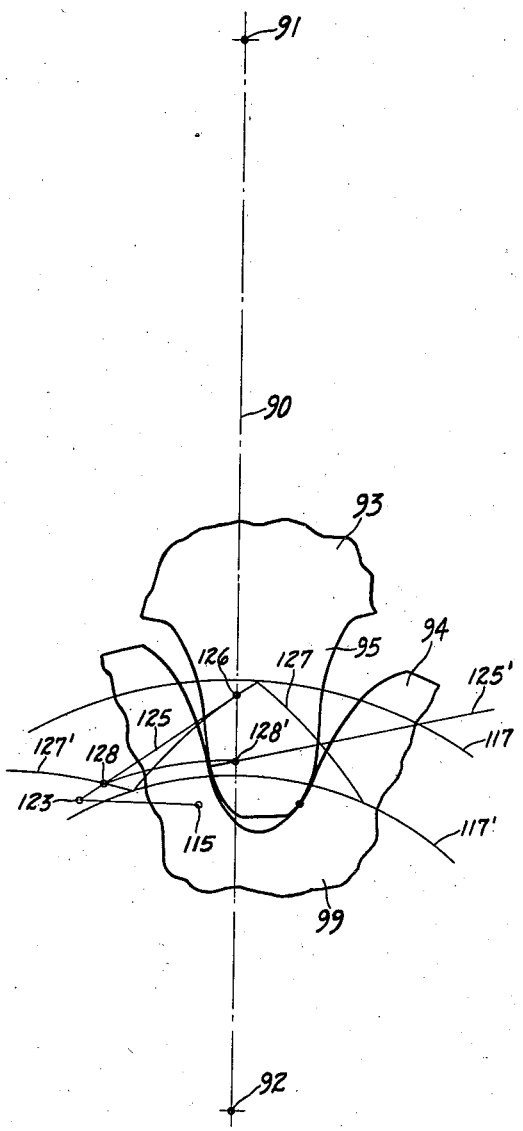

A similar procedure is followed for determining the top portion of the gear tooth and the flank or bottom portion of the pinion tooth as shown in Figs. 15 and 16. Fig. 15 shows a position where the tooth of the gear is symmetrical with reference to the line of centers 90. Here tooth contact takes place in the point 115 so that the normal 116 passes through instantaneous axis 98' in the lowermost position of the instantaneous axis. The uppermost position of the instantaneous axis is denoted at 98. Circles 117 and 117' concentric with pinion axis 92 contain the extreme positions of the instantaneous axis. Mesh takes place along the line of action 115—118, contact between the gear and pinion occurring in the point 118, when gear and pinion have rotated from the position shown in full lines in Fig. 15 to the position shown in dotted lines in that figure. 120 and 121 denote the centers of curvature of the convex and concave profiles of the gear and pinion teeth, respectively, when contact is made at the point 118.

Again we may extend the concave curve further by extending the line of action to a point such as the point 123 in Fig. 16. The normal 125 at point 123 is parallel to the normal 116 and intersects the plane of centers 90 at point 126. The pitch line 127 of the pinion must pass through this point when generating contact is made at point 123, that is, when the pinion profile passes through 123. The normal 125 intersects the slope 127' of the pinion pitch line 127 at the point 128. Point 123 comes into contact with the gear after rotation of the pinion through an angle 128—92—128', that is, when the pinion is rotated far enough to bring the point 128 into the plane of centers 90. The normal to the point 128' has then a much reduced inclination as denoted at 125'.

To join the curves obtained for the two ends of the teeth, we may select any pair of parallel normals 113 (Fig. 14) and 125' (Fig. 16) and provide convex mating profiles for the distance not previously covered. These convex mating profiles should be conjugate to a straight rack profile inclined at the pressure angle of the normals 113 and 125'. In other words, these normals should also be normal to said straight rack profile. In addition to this, the tooth thicknesses of the two members of the pair will have to be balanced and the profiles will have to be selected to obtain single continuous profiles. The finally selected tooth profiles will be equidistant from the initial profile if they do not actually coincide with them. That is, they will have the same system of normals.

The selection of mating convex profiles for the intermediate portions of the gear tooth profiles can be avoided, if desired. The normals 113 (Fig. 14) and 125' (Fig. 16) have a distance from each other which depends on the inclination of these parallel normals. To avoid the intermediate portion, we may determine by trial and interpolation a pair of normals 113, 125' which coincide, that is, which have a zero distance from one another. This is accomplished by further extended lines of action 96—107 (Fig. 14) and 115—123 (Fig. 16) to obtain smaller final inclination of the normals.

It will be noted that the radii of curvature of both the concave and convex portions of the gear tooth profile 102 increase toward the intermediate point 105 and that likewise the radii of curvature of the mating convex and concave portions of the pinion tooth profile increase toward the intermediate point 106. Both concave and convex portions of the profiles have finite radii of curvature at their junction points 105 and 106.

Bevel gears may be treated like spur gears, the layouts being made in the back cones. If desired for the final computation a spherical version of the above procedure may be made by employing the known procedures of spherical trigonometry.

Fig. 17 shows a pair of varying-leverage gears constructed according to the present invention and intended to provide a greater variation in leverage than has heretofore ever been obtained with success. The gear is denoted at 130 and the pinion at 131. The gear axis is at 132 and the pinion axis at 133. The tooth profiles of the teeth of both gear and pinion are concave in the flank and convex for the rest of the height of the teeth in accordance with the principles of this invention as already set forth. The pitch line of the gear is shown at 134 and the pitch line of the pinion at 135. The circles 136 and 136' show the limits of the positions of the instantaneous axis for the gear, and the circles 137 and 137' show the limits of the instantaneous axis for the pinion. The inclination of the pitch lines to the periphery of the gears in the instance shown is 45°, which means faster acceleration and deceleration of the gears as they revolve together. The construction shown has the advantage that a given change of leverage can be obtained by using a greater number of teeth in gear and pinion than has heretofore been possible. This is especially valuable on large size differential gears, where the previously known design has required that the gears be of unduly large pitch. In the present invention, we are able to use a much finer pitch and still obtain the desired variation in leverage, or by using the same pitch as was employed in previous design, it is possible to obtain a greater variation in leverage.

The present invention may be applied, as already indicated, to either spur or bevel gears, and whether the gears have longitudinally straight or curved teeth. While the invention has been described in connection with different embodiments thereof, it will be understood that it is capable of still further modification, and this application is intended to cover any variations, uses, or adaptations of the invention following, in general, the principles of the invention and including any departures from the present disclosure as come within known or customary practice in the gear art and as may be applied to the essential features hereinbefore set forth and as fall within the scope of the invention or the limits of the appended claims.

Having thus described my invention, what I claim is:

1. A pair of varying-leverage gears, each member of which has a tooth profile that is convex for a portion of its height and concave for the rest of its height.

2. A pair of varying-leverage gears, each member of which has a tooth profile that is concave in the flank or lower portion of the tooth and convex in the upper portion of the tooth.

3. A varying-leverage gear having a tooth profile that is concave in its lower portion and convex in its upper portion, the radii of the concave and convex portions of the tooth profile being finite at the juncture of the two portions of the profile.

4. A varying-leverage gear having a tooth profile that is concave in its lower portion and convex in its upper portion, the radii of both the convex and concave portions of the profile increasing toward the juncture of said two portions of the profile.

5. A varying-leverage gear having tooth profiles that are concave in their lower portions and convex in their upper portions and in which the radius of curvature of the concave portion of each profile increases toward the juncture of the two portions of the profile.

6. A pair of varying-leverage gears, each of which has teeth whose profiles are concave in the lower portion of the teeth and convex in the upper portion of the teeth, the curvature of the convex portion increasing toward the tip of the tooth and the curvature of the concave portion increasing toward the root of the tooth.

7. A pair of varying-leverage gears which have undulatory pitch surfaces and in which the main portion of each tooth profile, which corresponds to one slope of the undulatory pitch surface, has a pressure angle varying at least fifty percent.

8. A pair of varying-leverage gears having tooth profiles whose pressure angle at the top of a tooth at the extreme position of the instantaneous axis of mesh of the gears is at least fifty percent greater than at the middle of the tooth height for a mean position of the instantaneous axis.

9. A pair of varying-leverage gears having tooth profiles whose pressure angle remains substantially constant at the top of the teeth and is at least fifty percent greater than at the middle of the tooth height.

10. A varying-leverage gear in which the tangent to each tooth profile at the lowest point of the active portion of the profile is inclined to the center line of the tooth at an angle at least fifty percent greater than is the tangent to the tooth profile at the center of the height of the profile.

11. A pair of varying-leverage gears which have undulatory pitch surfaces, the pitch of whose undulations is equal to the pitch of the gears, the sides of each undulation being symmetrical and being inclined to the periphery of the respective gear at an angle of 45°.

12. A pair of varying-leverage gears whose tooth profiles are concave in the flank or lower portions of the teeth and convex in the upper portions of the teeth, the tangent to each tooth profile at the lowest point of the active portion of the profile being inclined to the centerline of the tooth at an angle at least fifty percent greater than is the tangent to the tooth profile at the center of the height of the profile.

ERNEST WILDHABER.